United States Patent [19]
Toomey

[11] Patent Number: 5,958,595
[45] Date of Patent: Sep. 28, 1999

[54] BONDABLE AND TAPE/LABEL-RELEASABLE TOP-COATED OVERLAYS USEFUL IN THE MANUFACTURE OF DECORATIVE LAMINATE PANELS

[75] Inventor: Cornelius J. Toomey, St. Louis, Mo.

[73] Assignee: Borden Inc., Columbus, Ohio

[21] Appl. No.: 08/847,572

[22] Filed: Apr. 24, 1997

[51] Int. Cl.$^6$ .............................. B32B 27/00; B32B 27/40
[52] U.S. Cl. ..................................... 428/423.5; 428/423.5; 427/208.4; 427/372.2; 427/407.1
[58] Field of Search ................................ 428/423.5, 543; 427/208.4, 372.2, 407.1

[56] References Cited

U.S. PATENT DOCUMENTS

| | | | |
|---|---|---|---|
| 3,929,698 | 12/1975 | Hudson et al. | 260/22 CB |
| 3,937,678 | 2/1976 | Yasuda et al. | 260/28.5 R |
| 4,117,198 | 9/1978 | Power et al. | 428/452 |
| 4,118,541 | 10/1978 | Power et al. | 428/452 |
| 4,371,605 | 2/1983 | Renner | 430/280 |
| 4,474,694 | 10/1984 | Coco et al. | 260/123.5 |
| 4,961,788 | 10/1990 | Krinski et al. | 106/154 |
| 5,391,664 | 2/1995 | Takei et al. | 526/210 |

OTHER PUBLICATIONS

"Voluntary Product Standard and Typical Physical Properties of Low Basis Weight Paper Overlays," Aug. 1992, pp. 19–32.

*Primary Examiner*—Duc Truong
*Attorney, Agent, or Firm*—Senniger, Powers, Leavitt & Roedel

[57] ABSTRACT

A decorative overlay having a unique and useful combination of properties—the capability to bond with polyamide adhesives used in fabricating end-use laminated articles while maintaining the capability to release adhesives of pressure-sensitive tapes and/or labels—is disclosed. Top-coating compositions used to produce such decorative overlays are also disclosed. Preferred top-coating compositions comprise the product resulting from the combination of ingredients which include melamine resin, acid and hydroxyamide. The weight ratio of acid:melamine resin is preferably at least about 1:5 and the weight ratio of hydroxyamide:melamine preferably ranges from about 1:3 to about 2:1. A polyalcohol cross-linking agent and a solvent are also preferably included in the composition. The composition is used to prepare both plastic-film type and paper overlays. The overlays can be, in turn, use to produce decorative laminate panels, and ultimately, end-use laminated articles such as furniture and cabinets. Advantageously, end-use laminated articles can be manufactured according to the methods set forth herein which include gluing of end-use components without sacrificing the capability of using pressure-sensitive labels and/or tapes in conjunction therewith.

32 Claims, No Drawings

BONDABLE AND TAPE/LABEL-RELEASABLE TOP-COATED OVERLAYS USEFUL IN THE MANUFACTURE OF DECORATIVE LAMINATE PANELS

BACKGROUND OF THE INVENTION

The present invention generally relates to the production of decorative laminate panels and, specifically, to top-coated overlays used in such production. The invention particularly relates to compositions suitable for use in preparing decorative overlays, to decorative overlays and to methods employing decorative overlays in the production of end-use laminated articles such as furniture and cabinets.

A number of approaches are known for manufacturing decorative laminate panels. For example, "low-pressure" laminate panels are typically produced by applying a resin-impregnated decorative overlay over a self-supporting substrate such as particleboard, plywood, etc. and heating the resulting composite to temperatures ranging from about 100° C. to about 200° C. while applying a pressure ranging from about 250 psig to about 750 psig. "High-pressure" laminate panels can be produced by applying a resin-impregnated decorative overlay over a series of phenol/formaldehyde resin-impregnated kraft sheets and heating the resulting composite to temperatures ranging from about 100° C. to about 200° C. while applying a pressure of at least about 900 psig, and typically ranging from about 1100 psig to about 1500 psig. In another approach, decorative laminate panels are produced by a hot roll lamination method in which a top-coated decorative overlay in roll form is bonded to a substrate (e.g. board) by an adhesive preapplied to either the board or the backside of the decorative overlay. Other methods for producing decorative laminate panels, such as the use of reverse-printed membrane pressable films, are likewise known in the art. The decorative laminate panels produced according to these and other approaches are used for the manufacture of a wide variety of end-use laminated articles, including for example cabinets, countertops, furniture, plaques, marketing displays, automobile components, etc.

The decorative overlays typically used in such laminate panel manufacturing processes include, for example, plastic-film overlays such as vinyl, polyester, polypropylene, acrylic and fluoropolymer films, and top-coated paper overlays. Decorative overlays can be prepared by printing a substrate such as paper or plastic-film with, for example, a solid color and/or a design such as wood-grain design, and applying a coating of a resin-type material, such as a melamine resin, urea-formaldehyde resin, polyurethanes, epoxies, acrylics and other resins, over the substrate or printed substrate. The top-most coating overlying the substrate, generally referred to in the art as a top-coating, is intended to protect the underlying printing and to impart desirable properties to the overlay. Desirable properties include, for example: hardness, toughness, gloss, scratch resistance, abrasion resistance, water-resistance, chemical-resistance, heat-resistance, ultraviolet-resistance (e.g. to fade and/or darkening), gluability, label-releasability and tape-releasability. Industry-standardized specifications for these and other properties of top-coated decorative overlays have been developed. For example, the Kitchen Cabinet Manufacturer's Association (KCMA) provides target specifications for such overlays in ANSI/KCMA A161.1-1990. Another set of specifications is included in *Voluntary Product Standards and Typical Physical Properties of Low Basis Weight Paper Overlays* published by the Laminating Materials Association as LMA Standard LBW-1-1992.

A number of compositions are known in the art for use in preparing top-coated decorative overlays. For example, a number of known compositions include a cross-linked melamine-based resin. Such cross-linked melamine resins are typically prepared by combining a melamine resin with a cross-linking agent such as a polyol and a catalyst in an appropriate solvent. Additives such as waxes (e.g. teflon, carnauba) and/or silicones are reported as being combined therewith to impart desirable properties to the resulting top-coating.

While the decorative overlays based on such compositions would preferably possess all of the desired properties to a satisfactory degree simultaneously, known overlays more typically possess desired properties to varying degrees with trade-offs made between two or more desired properties. For example, there is a need in the manufacturing of end-use laminated articles for decorative laminate panels that have an exposed top-coated-decorative-overlay surface which can be glued or bonded to another component of the article. Additionally, because such articles are typically sold with pressure-sensitive labels and/or tape applied to their surfaces and because such articles are often subjected to repeated applications of pressure-sensitive tape to their surfaces when in use (e.g. masking tape applied to cabinets for painting purposes), there is also need for a decorative overlay having a top-coated surface which allows for release of labels and/or tape without damage to the surface. However, decorative overlays known in the art have not, heretofore, simultaneously satisfied both of these needs.

SUMMARY OF THE INVENTION

It is therefore an object of the present invention to provide a broader range of manufacturing methods for construction of end-use laminated articles from decorative laminate panels, and particularly, from decorative laminate panels with top-coated decorative overlays. It is likewise an object of the invention to allow for the manufacture of end-use laminated articles which are more durable, and to thereby increase the useful life of such articles.

Briefly, therefore, the present invention is directed to a composition suitable for use in preparing a top-coating of a decorative overlay. The composition is the product resulting from the combination of ingredients which include melamine resin, acid, and hydroxyamide. The melamine resin, acid and hydroxyamide are preferably combined with the weight ratio of acid:melamine resin being at least about 1:5 and the weight ratio of hydroxyamide:melamine resin ranging from about 1:3 to about 2:1.

In a preferred embodiment, the composition is the product resulting from the combination of ingredients which include melamine resin, acid, hydroxyamide, polyalcohol cross-linking agent and solvent. More specifically, the composition is the product resulting from the combination of ingredients which include melamine resin comprising a compound of Formula I in an amount ranging from about 20% to about 50% of the total weight of the composition,

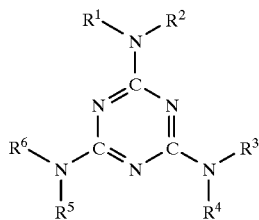

where $R^1$ through $R^6$ are, independently, selected from the group consisting of hydrogen, $C_1$–$C_4$ alkyl, —$R^7OH$, and —$R^7OR^8$, where at least two of $R^1$ through $R^6$ are, independently, —$R^7OH$ or —$R^7OR^8$, and where $R^7$ and $R^8$ are, independently, $C_1$–$C_4$ alkyl, polyalcohol cross-linking agent in an amount ranging from about 10% to about 50% of the total weight of the composition, acid in an amount comprising at least about 9% of the total weight of the composition, hydroxyamide of Formula II in an amount ranging from about 15% to about 35% of the total weight of the composition,

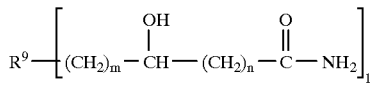

where $R^9$ is selected from the group consisting of hydrogen, a $C_1$–$C_5$ alkyl, a $C_1$–$C_5$ alkenyl and a $C_1$–$C_5$ alkynyl, n ranges from 0–20, m ranges from 0–20 and l is 1 or 2, and solvent.

In a most preferred embodiment, the composition is the product resulting from the combination of ingredients which include hexamethoxymethylmelamine, N,N'-ethylene bis(12-hydroxystearamide), paratoluenesulfonic acid, a modified castor-oil polyol and methanol.

The invention is also directed to a process for preparing a composition suitable for use in forming a top-coating of a decorative overlay. The process comprises combining ingredients which include melamine resin, polyalcohol cross-linking agent, acid, hydroxyamide and solvent to form a uniformly-dispersed heterogeneous mixture.

The invention is directed as well to a decorative overlay suitable for use in manufacturing decorative laminate panels. The overlay includes a substrate and a top-coating overlying the substrate. The top-coating comprises cross-linked melamine resin and hydroxyamide bonded to the melamine resin.

The invention is directed, moreover, to a method for producing a decorative overlay suitable for use in manufacturing decorative laminate panels. In this method, a composition is applied over a substrate to form a composition-coated substrate. The composition comprises a uniformly-dispersed heterogeneous mixture formed by combining ingredients which include melamine resin, acid and hydroxyamide, and which optionally further include polyalcohol cross-linking agent and/or solvent. The composition-coated substrate is then dried.

The invention is further directed to a method for producing end-use laminated articles from decorative laminate panels. Polyamide adhesive is applied to an exposed surface of a first component of the article. The exposed surface of the first component is contacted with an exposed surface of a second component of the article, where the second component is a decorative laminate panel material comprising a top-coated decorative overlay. The exposed surface of the second component consists essentially of the top-coating of the overlay. A pressure-sensitive tape or label is then releasably applied to the exposed surface of the second component of the article.

The compositions, decorative overlays and various methods of the present invention are advantageous over those known in the art. Because the decorative overlays of the present invention offer, in combination, commercially satisfactory gluability and label- and/or tape-releasability properties, these overlays create new opportunities for manufacturing improved end-use laminated articles from decorative laminate panel materials.

Other features and objects of the present invention will be in part apparent to those skilled in the art and in part pointed out hereinafter.

DETAILED DESCRIPTION OF THE INVENTION

A commercially important aspect of the present invention relates to a decorative overlay having a unique and useful combination of properties—the capability to bond with adhesives used in fabricating end-use laminated articles while maintaining the capability to release adhesives of pressure-sensitive tapes and/or labels.

A preferred composition suitable for use in producing a top-coated decorative overlay capable of bonding with polyamide adhesives and allowing the release of pressure-sensitive adhesives is the product resulting from the combination of ingredients which include melamine resin, acid and hydroxyamide, and optionally, polyalcohol cross-linking agent and/or an appropriate solvent. Without being bound by theory, the combination of the above-listed composition ingredients is believed to result in reactions by which: the melamine resin compounds are cross-linked with each other and, where polyalcohol is present, with polyalcohol cross-linking "bridges"; the hydroxy moieties of the hydroxyamide become chemically bonded, and likely covalently bonded to alkylol and/or alkoxyalkyl functional groups on the melamine resin; and the acid catalyzes the cross-linking of the melamine compound and also facilitates appropriate incorporation of the hydroxyamide into the cross-linked melamine structure.

The melamine-resin of the top-coating composition includes commercially available amino resins based on or derived from melamine which can be or have been cross-linked under appropriate conditions to form a suitable top-coating. Exemplary melamine resins include: di-, tri-, tetra-, pentyl- and hexa- alkylol melamines; and di-, tri-, tetra-, pentyl- and hexa-alkoxyalkyl melamines. Mixed alkoxyalkyl melamines (e.g. dimethoxymethyl-tetramethoxyethyl melamines) can also be employed. Preferred melamine resins comprise a compound of Formula I,

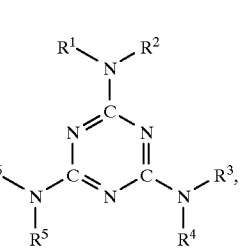

where: $R^1$ through $R^6$ are, independently, selected from the group consisting of hydrogen, $C_1$–$C_4$ alkyl, —$R^7OH$, and —$R^7OR^8$, where at least two of $R^1$ through $R^6$ are, independently, —$R^7OH$ or —$R^7OR^8$, and where $R^7$ and $R^8$ are, independently, $C_1$–$C_4$ alkyl. More preferred melamine resins comprise a compound of Formula I where $R^1$ through $R^6$ are, independently, selected from the group consisting of hydrogen, —$CH_2OH$ and —$CH_2OCH_3$ and where at least two of $R^1$ through $R^6$ are, independently, —$CH_2OH$ or —$CH_2OCH_3$. A most preferred melamine resin comprises hexamethoxymethyl melamine (optionally referred to herein as "HMMM").

Methods for producing melamine resins are well known in the art, as exemplified by the methods set forth in the following U.S. Pat. Nos. 2,906,724; 2,918,452; 2,998,411; 3,107,222; and 3,422,076. Such methods typically include reacting melamine with formaldehyde to form a alkylol or alkoxyalkyl substituted melamine. Moreover, melamine resins are available from a number of commercial vendors. HMMM can be obtained, for example, from Monsanto Company (St. Louis, Mo.) under the trade-names Resimene™ 747 or Resimene™ 745, and/or from Cytec Industries, Inc. (Southfield, Mich.) under the tradename Cymel™ 303. Commercially available melamine resin is typically provided as a liquid having greater than 98% total solids and, possibly, including a small amount residual reactant used to prepare the melamine resin from melamine (e.g. typically formaldehyde—present in an amount which is less than about 0.25% by weight in Resimene™ 747). Agents for cross-linking the melamine resin are discussed below in connection with the method for producing the preferred top-coating composition of the invention.

The particular acid used to catalyze the cross-linking of the melamine resin and to facilitate incorporation of the hydroxyamide into the cross-linked melamine is not narrowly critical. The acid can be a mineral acid or an organic acid. Suitable mineral acids can include sulfuric acid, phosphoric acid and hydrochloric acid among others. The organic acid can be a carboxylic acid or a cyclic organic acid such as an aromatic organic acid. Preferred acids include aromatic sulfonic acids such as benzene sulfonic acid, xylene sulfonic acid, toluene sulfonic acid (e.g. paratoluenesulfonic acid) and the like. Such acids are well known and commercially available from many sources. The preferred aromatic sulfonic acids are available, for example, from Ashland Chemical Company (Columbus, Ohio) under the trade name WITCO TX ACID™. This acid is a toluene/xylene sulfonic acid.

The hydroxyamide of the top-coating composition is an organic compound having one or more hydroxy functional groups and one or more amide functional groups. The hydroxyamide is preferably a fatty-acid hydroxyamide. As used herein, the term "fatty-acid hydroxyamide" is intended to include (a) an amide derivative of a fatty acid having at least one hydroxy functional group, whether or not such fatty acids are further substituted with other functional groups and/or (b) compounds which include the amide derivatives of (a). Preferred hydroxyamides are compounds of Formula II,

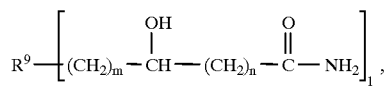
(II)

where $R^9$ is selected from the group consisting of hydrogen, a $C_1$–$C_5$ alkyl, a $C_1$–$C_5$ alkenyl and a $C_1$–$C_5$ alkynyl, n ranges from 0–20, m ranges from 0–20 and l is 1 or 2. More preferred hydroxyamides include those of Formula II where $R^9$ is as described above, n ranges from 5 to 20 and preferably about 10, m ranges from 0–20 and l is 1 or 2. Without being bound by theory, n is preferred to be at least 5 for compounds of Formula 2 to provide additional physical separation between the hydroxy and amide moieties of the hydroxyamide, with such separation leading to improved functionality of the hydroxyamide in the top-coating composition. A more preferred hydroxyamide is a $C_{1-20}$ fatty acid hydroxyamide. A most preferred hydroxyamide is N,N'-ethylene bis(12-hydroxystearamide). Such hydroxyamides are known in the art and commercially available from many sources. The preferred fatty-acid hydroxyamides are available, for example, as amide-modified castor oils from CasChem, A CAMBREX Company, (Bayone, N.J.). The preferred hydroxyamide, N,N'-ethylene bis(12-hydroxystearamide), is available from CasChem under the trade name PARICIN™ 285 FLAKE.

The polyalcohol can be used as an agent to facilitate cross-linking of the melamine resin. The polyalcohol is an organic compound having at least two hydroxy functional groups. Polyalcohol compounds are sometimes referred to in the art as polyhydric alcohols. Exemplary polyalcohols include modified oil-based polyols such as modified castor oil polyols, glycerol, glycol, ethylene glycol, propylene glycol, diethylene glycol, dipropylene glycol, trimethylene glycol, neopentyl glycol, pinacol, trimethylol propane, arabinol, sorbitol, pentaerythritol and the like. Such polyalcohols are well known in the art and are available from many commercial sources. Preferred polyalcohols are modified oil-based polyols such as the GB-100 modified castor oil polyol manufactured by AKZO Resins, Inc. (East St. Louis, Ill.), Code Identification 20-3966.

A solvent can be combined with the melamine resin, acid, hydroxyamide and, optionally the polyalcohol to help facilitate the formation of a uniformly dispersed hetergeneous mixture and to control viscosity of the resulting composition. Aqueous solvents and organic solvents may be suitably employed, and either may be preferred for a particular decorative overlay production process. Water is a preferred aqueous solvent. Preferred organic solvents include alcohols, esters, acetates and ethers such as ethyl or propyl ethers. Solvents comprising $C_{1-4}$ alcohols such as methanol, ethanol, isopropanol, etc. are particularly preferred. While the solvent can consist essentially of a single compound, the solvent can also comprise a mixture of compounds such as alcohols and esters. Such mixed solvents are preferably predominantly made up of $C_{1-4}$ alcohols. As used herein, the term "predominantly" is intended to mean that such alcohols comprise at least about 50% of the solvent. Exemplary mixed solvents include denatured alcohols. Such solvents are well known and commercially available from many sources. A preferred denatured alcohol solvent is available commercially, for example, from Grain Processing Corporation (Muscatine, Iowa) as the product designated as "190 proof or Anhydrous GPC Duplicating Fluid 105C 'NPA' 10C106, 11C106, T-331."

The melamine resin, acid and hydroxyamide are preferably combined with the weight ratio of acid:melamine resin being at least about 1:5 and preferably being about 1:3 and the weight ratio of hydroxyamide:melamine resin ranging from about 1:3 to about 2:1 and preferably being about 1:2. In a preferred embodiment, the composition comprises the product resulting from the combination of: the melamine resin in an amount ranging from about 20% to about 50% of the total weight of the composition; the acid in an amount comprising at least about 9% of the total weight of the composition and preferably in an amount ranging from about 9% to about 20%; the hydroxyamide in an amount ranging from about 15% to about 35% of the total weight of the composition; the polyalcohol cross-linking agent in an amount ranging from about 10% to about 50% of the total weight of the composition; and the solvent in an amount sufficient to form a composition having a viscosity suitable for commercial application to a substrate. For example, where the top-coating composition will be subsequently applied to a substrate using direct gravure application methods, the solvent is preferably combined with the other composition ingredients in an amount sufficient for the composition to have a viscosity ranging from about 15 seconds to about 50 seconds as measured with a No. 2 EZ cup at 77° F. In a more preferred embodiment, the composition comprises the product resulting from the combination of: about 30% by weight melamine resin; about 10% by weight acid; about 15% by weight hydroxyamide; about 20% by weight polyalcohol cross-linking agent; and about 25% by weight solvent.

A most preferred top-coating composition comprises the product resulting from the combination of hexamethoxymethylmelamine (HMMM), N,N'-ethylene bis(12-hydroxystearamide), and paratoluenesulfonic acid, and optionally, a modified castor-oil polyol and/or methanol. In a preferred embodiment of the most preferred composition, the weight ratio of paratoluenesulfonic acid:HMMM is at least about 1:5 and is preferably about 1:3 and the weight ratio of N,N'-ethylene bis(12-hydroxystearamide): HMMM ranges from about 1:3 to about 2:1 and is preferably about 1:2.

The preferred top-coating compositions can be prepared by combining the melamine resin, the acid, the hydroxyamide, and optionally, the polyalcohol cross-linking agent and/or the solvent to form a uniformly-dispersed heterogeneous mixture. (See, for example, Example 1). Liquid ingredients of the composition—typically including melamine resin, acid, polyalcohol cross-linking agent and solvent—can be mixed in a container at high speed until more viscous liquids (e.g. acid) are dissolved in and fully integrated with less viscous liquids (e.g. solvent). The container in which the composition ingredients are mixed is preferably clean and dry and can be of any suitable type (e.g. a closed, vented reaction/mixing vessel, an open reaction/mixing vessel, a 55 gallon drum, etc.). The solid component (s) of the composition—hydroxyamide in a preferred process—are then added to the mixture with mild agitation and dispersed by further high-speed mixing. The mixing is preferably continued until the composition is a uniformly dispersed heterogeneous mixture. Ventilation is preferably provided in accordance with industry norms and OSHA standards. In addition to the aforementioned composition ingredients, other agents, additives, etc. such as conventional thickening agents, leveling agents, etc. may also be added to the top-coating composition as desired in order to adjust its viscosity and/or to regulate pick-up for use with a particular application.

Where it is possible to integrate preparation of the top-coating composition with the production of the decorative overlay, the polyalcohol cross-linking agent or the solvent, and preferably both, are preferably combined with the melamine resin, acid and hydroxyamide as describe above. In such a case, the top-coating composition made from the combination of the melamine resin, acid, hydroxyamide, polyalcohol cross-linking agent and solvent have a room-temperature storage time before curing, typically referred to as the "pot-life" of the composition, ranging from about one to three weeks. Higher temperatures will accelerate the curing of the catalyzed composition. While the absence of solvent will generally reduce the pot-life of the catalyzed composition, the production of the top-coating composition without the solvent component may, nonetheless, be desirable in certain circumstances. For example, where it is desired or necessary to ship the composition to a remote location for use, the absence of the solvent will decrease the total volume of the composition. Moreover, where integration of the top-coating composition preparation and the decorative overlay production is not possible, or under some other circumstances, it may be desirable to form the composition without the polyalcohol cross-linking agent and/or without the acid catalyst. For example, where it is desired to store the top-coating composition before use thereof to produce a top-coated decorative overlay, the absence of the cross-linking agent and/or the acid will help slow the curing rate of the melamine resin. If the top-coating composition is initially formed without the polyalcohol cross-linking agent and/or without the solvent, these ingredients are preferably added to the earlier-formed preliminary composition made by combining melamine resin, acid and hydroxyamide before use of the composition to produce decorative overlays. Regardless of whether or not the composition is prepared with the polyalcohol cross-linking agent and/or the solvent, other practical methods can be employed to facilitate storage and/or transfer of the composition. For example, the container in which the top-coating composition resides can be covered, the storage temperature of the composition can be lowered, etc.

The top-coating compositions, prepared as described above, can be used to produce decorative overlays. (See, for example, Example 2). Decorative overlays suitable for use in manufacturing decorative laminate panels are generally produced by applying the top-coating composition to a substrate or to an intermediate layer overlying a substrate to form a composition-coated substrate, and then drying the composition-coated substrate.

The substrate can be a material of sufficient wet strength to allow for top-coating to form a decorative overlay which can, in turn, be suitably incorporated into decorative laminate panels. Acceptable substrate materials include plastic films such as vinyl, polyester (e.g. mylar films used with transfer-printing methods), polypropylene, acrylic and fluoropolymer films, and cellulosic materials such as paper. Paper is a preferred substrate material. The paper substrate is preferably plain paper, but can, alternatively, be a coated, treated, and/or finished paper. Exemplary papers include bleach sulfate, kraft, clay-coated kraft, parchment, clay-coated parchment, greaseproof paper, glassine paper, clay-coated publication paper and the like. While the weight of the paper substrate is not particularly limiting, weights ranging from about 30 $g/m^2$ to about 60 $g/m^2$ are acceptable for use in manufacturing a decorative paper overlay. A paper weight of about 30 $g/m^2$ is generally preferred.

The top-coating composition can be applied directly over the substrate and adjacent thereto, or alternatively, it can be applied over and adjacent to one or more intermediate layers situated between the top-coating and the substrate. Such intermediate layers can include, for example, coatings or treatments for imparting one or more desirable properties, printing inks, etc., and can cover an entire substrate surface or selected portions thereof. For example, to improve water holdout properties of the top-coating of the present invention, it is preferred to apply the top-coating composition over an intermediate layer having acceptable water-holdout properties, such as melamine-based coatings known in the art. Where desired, intermediate layers can be applied over the substrate as known in the art.

The top-coating composition can be applied by suitable methods known or later developed in the art. Exemplary application methods for coating cellulosic substrates such as paper include reverse-roll, air knife, gravure cylinder, flexographic methods and other methods now known or later developed. Application with a direct gravure printing press is preferred. Regardless of the type of application method, the coating weight can range from about 0.5 to about 1.5 pounds per 1000 square feet and preferably is about 1 pound per 1000 square feet. When a gravure cylinder is used, such coating weights can be achieved by applying the composition using screen sizes ranging from about 75 line to about 200 line with a 100 line screen being preferred. The line speed can range from about 100 feet per minute to about 1000 feet per minute with a speed of about 200 feet per minute being preferred. Similar application methods are used regardless of whether the substrate is a cellulosic substrate such as paper or a plastic-film substrate.

After applying the composition to the substrate, the composition-coated substrate is then dried to facilitate curing of the melamine resin. The drying temperature is not limiting of the invention, but can generally be commensurate with the coating weight, type and amount of solvent, and the substrate's strength and dimensional stability. The preferred composition applied to a cellulosic substrate as described herein can be dried in gas-fired convection of ovens or infrared drying ovens at a temperature ranging from about 350° F. to about 450° F. and preferably at a temperature ranging from about 350° F. to about 400° F.

The resulting decorative overlay generally comprises the substrate and a top-coating adjacent to and overlying the substrate. Alternatively, the decorative overlay can also comprise one or more intermediate layers situated between the top-coating and the substrate. The cured top-coating comprises cross-linked melamine resin and hydroxyamide bonded to the resin.

The presence of the hydroxyamide in the top-coating imparts the desired gluability and releasability properties to the decorative overlay. Without being bound by theory, it is believed that the hydroxy moiety of the hydroxyamide is chemically bonded, and most likely covalently bonded, to the cross-linked melamine resin. It is further believed that the amide functional group of the hydroxyamide interacts with the polyamide fabrication adhesive to form a strong, likely chemical bond. Preferably, the bond formed between the polyamide fabrication adhesive and the top-coating of the decorative overlay is, when the adhesive has cured, sufficiently strong that when subjected to tensile-stress testing in which the stress is increased until failure occurs, the observed failure is by a mode other than the release of the glue from the top-coating. For example, the failure mode may be by separation of the top-coating from the substrate material or by separation of the substrate material from itself. Polyamide fabrication adhesives include adhesives which bond by the formation of polyamides. Such adhesives are well known in the art and are commercially available from a number of sources. Exemplary polyamide fabrication adhesives include those sold as hot-melt adhesives by H. B. Fuller Co. When the amide functional groups are incorporated into a densely formed melamine resin, it is believed that the amide moieties also act as a wax-like releasing agent with respect to a pressure-sensitive adhesive. Pressure-sensitive adhesives include adhesives typically used to apply pressure-sensitive tapes (e.g. masking tapes, see-through tapes, package-sealing tapes, etc.) and/or pressure-sensitive labels (e.g. product information labels, UPC-code labels) to a surface. Preferably, when such pressure-sensitive tape and/or labels are applied over the top-coating of the decorative overlayer, the tapes and/or labels are releasable therefrom without causing substantial observable detriment to the decorative overlayer or to a decorative laminate panel in which the overlay subsides. For example, there is preferably substantially no observable separation of the top-coating from itself or from the substrate, and substantially no observable separation of the overlayer substrate from itself or from the laminate-panel substrate. Exemplary pressure-sensitive adhesives presently known in the art include adhesives used on tapes such as masking tapes and see-through tapes such as are manufactured by Minnesota Mining and Manufacturing (3M™) under the tradenames Scotch™ 600, Scotch™ 610 and Scotch™ 800.

The resulting decorative overlay has properties which are generally acceptable for use in producing decorative laminate panels, and as noted, are advantageous over prior art decorative overlays with respect to having combined superior gluability and releasability. (See, for example, Example 3). Significantly, the decorative overlays of the present invention achieve such gluability and releasability without substantially compromising other desirable properties. For example, the decorative overlays of the invention also exhibit superior abrasion resistance.

The decorative overlays of the present invention can be used to produce decorative laminated panels according to methods known in the art. As used herein, the term "decorative laminate panel" is intended to include a laminate material comprising a decorative overlay and having an exposed surface which consists essentially of the top-coating of the overlay. Such decorative laminate panels are typically produced via hot-roll lamination methods in which a top-coated decorative overlay in roll form is bonded to a substrate (e.g. board) by an adhesive preapplied to the board and/or the backside of the decorative overlay. Other methods for producing decorative laminate panels can also be used. The decorative laminate panels are typically mass-produced in sheets (e.g. 4'×8' sheets) and then cut as needed to the shapes and sizes necessary to manufacture a particular end-use article. Alternatively, however, such laminate panels could be produced in particular shapes and/or sizes which are readily adaptable for the manufacture of an end-use article. Regardless of whether obtained by cutting stock-sized decorative laminate panels or by producing such panels in a particular size and/or shape, the decorative laminate panel materials are typically used in a number of well-known end-use laminated articles, including for example, furniture, cabinets, plaques, automobile, marketing displays, signage, shelving, recreational equipment, automobile components, boat components, etc.

Decorative laminate panel materials comprising a top-coated decorative overlay and having an exposed surface consisting essentially of the top-coatings described herein can be used advantageously in the manufacture of end-use laminated articles. In particular, the capability of the decorative-overlay top coating to bond with polyamide fabricating adhesives while maintaining the capability to release pressure-sensitive tapes and/or labels allows for the integration of gluing steps into known manufacturing methods without sacrificing the capability to use product identification labels, instruction labels, UPC code labels and/or without sacrificing the capability to attach assembly hardware or bags containing such hardware to the top-coated surface using a pressure-sensitive tape.

End-use laminated articles can be produced from decorative laminate panels comprising a top-coated decorative overlay. Specifically, a polyamide fabrication adhesive is applied to an exposed surface of a first component of the article. The first component can be a decorative laminate panel material, or alternatively, can be a non-laminated material including for example natural wood, metal, plastic, etc. The exposed surface of the first component to which the adhesive was applied is then contacted with an exposed surface of a second component of the article. The second component is a decorative laminate panel material of which the exposed surface consists essentially of the top-coating of the present invention. A pressure-sensitive tape or label can be releasably applied to the exposed surface of the second component of the article (or to an exposed surface of another component of the article which is also made of the decorative laminate panel material). The pressure-sensitive tape or label is releasable from the exposed surface.

The following examples illustrate the principles and advantages of the invention.

EXAMPLES

Example 1

Preparation of a Top-Coating Composition

A top-coating composition was prepared as follows.

Liquid ingredients including hexamethoxymethylmelamine resin (31.60% by weight—Monsanto Co. Resimene™ 747), polyalcohol cross-linking agent (18.8% by weight—AKZO Resin, Inc. GB-100 modified castor oil polyol), toluene/xylene sulfonic acid (11.2% by weight—Ashland Chemical Co. WITCO TX ACID™) and denatured ethyl alcohol (25.6% by weight—Grain Processing Corp.) were weighed into a clean, dry, plastic-lined fifty-five gallon drum. These ingredients were mixed at high speed until all of the acid was dissolved. Solid N,N'-ethylene bis(12-hydroxystearamide) (12.8% by weight—CasChem PARICIN™ 285 FLAKE) was added to the mixture with mild agitation and the combined mixture was then mixed at high speeds until the hydroxyamide was uniformly dispersed.

The amount of solvent used resulted in the composition having a viscosity of about 25 seconds as measured by No.2 EZ Cup at 77° F. The composition was covered while awaiting delivery to a press for production of a decorative overlay.

Example 2

Production of a Decorative Overlay

A top-coating composition prepared as set forth in Example 1 was used to prepare a decorative paper overlay as follows.

The composition of Example 1 was applied to 30 g/m² unprinted paper stock using a direct gravure printing press. The doctor blade angle was typically set at about 55° and the line speed was typically about 200 feet per minute. The composition was applied with a 100 line screen gravure cylinder at an application weight of about 3 pounds±½ pound per 3000 square feet.

In separate runs, the composition of Example 1 was applied to printed paper stock and, independently, to printed paper stock covered with a melamine-resin intermediate layer known to have good water-holdout properties. The application conditions were substantially as described for application to the unprinted paper stock.

The composition-coated was subsequently dried in a gas-fired convection oven at a temperature of about 400° F.

Example 3

Decorative Overlay Properties

A decorative paper overlay was produced as set forth in Example 2 using a printed substrate having a melamine-resin based intermediate layer known to have good water-holdout properties. The intermediate layer was coated onto the printed substrate at a weight of 2.92 lbs per 3000 ft² and the top-coating composition was applied thereover at a weight of 1.74 lbs per 3000 ft². This decorative paper overlay was tested to evaluate a variety of desirable properties according to standardized procedures known in the art.

Tape Release:

Scotch™ 600 tape was applied over an area of the top-coated decorative overlay at room temperature and allowed to remain thereover for a dwell period of 60 seconds. The tape was then vigorously ripped off of the overlay. Visual inspections were made to determine whether any pick-off of the top-coating occurred. The application, dwell, and removal of the tape was repeated six times over the same area of the top-coated surface. No pick-off was visually detected even after six cycles.

In an independent test, duct tape was applied over an area of the top-coated decorative overlay at room temperature and allowed to remain thereover for a dwell period of 60 seconds. The tape was then vigorously ripped off of the overlay. Visual inspections were made to determine whether any pick-off of the top-coating occurred after the single cycle. No pick-off was visually detected.

Cross-hatch Adhesion:

Cross-hatchings were cut at right angles into the surface of the top-coated decorative overlay. Duct tape was applied over an area of the cross-hatched overlay at room temperature and allowed to remain thereover for a dwell period of 60 seconds. The tape was then vigorously ripped off of the overlay at a 90° angle. Visual inspections were made to determine whether any pick-off of the top-coating occurred after the single cycle. No pick-off was visually detected.

Gluability:

A pool of hot-melt polyamide fabrication adhesive (H. B. Fuller) was dripped onto the top-coated surface of the overlay and allowed to dry. The glue was then picked at to determine whether the dried-glue could be removed from the top-coating. Glue could not be picked off without splitting the paper substrate, thereby indicating that the adhesive to coating bond was stronger than the paper substrate itself.

Gloss:

Gloss was measured using a Byk Microgloss glossmeter at an angle of 60°. Fifteen gloss readings were taken over different areas of the top-coated overlay surface. The average reading was about 25.7 and all of the readings were within the product specification of 25±5.

Solvent Resistance:

Methyl ethyl ketone (MEK) droplets were applied over the surface of the top-coated overlay and allowed to remain on the surface for 90 seconds. The MEK was then wiped off and the surface was rubbed 20 times with a paper towel. No visually detectable effect was observed.

Abrasion Resistance:

A Taber abraser (CS-17 wheels) loaded to 500 g. was applied to the top-coated surface. The number of cycles which the surface could endure before visual evidence of print-wear was determined. The top-coated surface endured 250 cycles before print wear—well within the industry norms ranging from about 150 to 350 cycles.

Water Hold Out:

Water was dripped onto the surface of the top-coated overlay and covered with a watch-glass. Visual inspections were made regularly to determine whether any of the paper substrate grain had been raised due to the presence of the water. The resulting hold-out time for the top-coated overlay was over 24 hours.

Blocking Tests:

In an adhesive-backed blocking test, alternating sheets of the top-coated decorative overlay and a laminate-panel-construction adhesive, A-3000 hot-melt, was subjected to a pressure of 2 lbs/in$^2$ for 24 hours at 140° F. The sheets were then examined for blocking and/or singing. In this test, the top-coated overlay exhibited blocking and/or singing, thereby indicating a failure of the test.

In a face-to-face blocking test, the top-coated decorative overlay sheets were placed face to face (w/top-coatings of each sheet being adjacent each other) and then subjected to a pressure of 2 lbs/in$^2$ for 24 hours at 140° F. The sheets were subsequently examined for blocking and/or singing. No blocking or singing was observed in this test, indicating a passing test.

Stain Resistance:

Various materials were dripped onto the surface of the top-coated overlay and covered with a watch-glass for 24 hours. After 24 hours, excess materials were wiped away and visual inspections were made to determine the effect on the top-coated surface. The results are reported in Table 1 with the materials being characterized as having no effect (NE), slight effect (SL), moderate effect (ME) or severe effect (SE). While some of the materials had slight, moderate or even severe effects at the time at which the excess material was wiped away, the effects were typically diminished after a period of time had passed.

TABLE 1

| Test | Visual Inspection |
|---|---|
| Distilled Vinegar | NE |
| Lemon Juice | NE |
| Orange Juice | NE |
| Grape Juice | NE |
| Tomato Catsup | NE |
| Coffee | SL |
| Olive Oil | NE |
| Isopropyl Alcohol | NE |
| Mustard | SE |
| Tap Water | NE |
| Vegetable Cooking Oil | NE |
| Tea | NE |
| 10% Citric Acid | NE |
| Beet Juice | NE |
| Red Kool-Aid | ME |
| Coca Cola | NE |
| Windex | NE |
| Household Soap Solution | NE |
| Fantastik | NE |
| Pinesol | NE |
| 5% Dishwashing Detergent | NE |
| Cascade | NE |
| Pledge | NE |
| Endust | NE |
| Naphtha | NE |
| 20% Solution of Isopropyl Alcohol | NE |
| Lipstick - Red | SE |
| Non-Oily Nail Polish Remover | SL |
| Shoe Polish - Black | SE |
| Wax Crayon - Black | NE |

TABLE 1-continued

| Test | Visual Inspection |
|---|---|
| Ball Point Pen Ink - Blue | SL |
| Household Ammonia | NE |

NE = no effect
SL = slight effect
ME = moderate effect
SE = severe effect

In light of the detailed description of the invention and the examples presented above, it can be appreciated that the several objects of the invention are achieved.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention.

I claim:

1. A composition suitable for use in preparing a top-coating of a decorative overlay, the composition comprising the product resulting from the combination of ingredients which include melamine resin, acid, and hydroxyamide.

2. The composition of claim 1 wherein the melamine resin, acid and hydroxyamide are combined with the weight ratio of acid:melamine resin being at least about 1:5 and the weight ratio of hydroxyamide:melamine resin ranging from about 1:3 to about 2:1.

3. The composition of claim 1 wherein the melamine resin comprises a compound of Formula I,

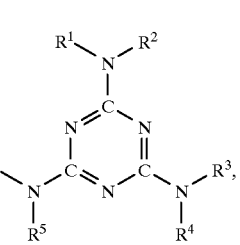

(I)

where $R^1$ through $R^6$ are, independently, selected from the group consisting of hydrogen, $C_1$–$C_4$ alkyl, —$R^7$OH, and —$R^7OR^8$, where at least two of $R^1$ through $R^6$ are, independently, —$R^7$OH or —$R^7OR^8$, and where $R^7$ and $R^8$ are, independently, $C_1$–$C_4$ alkyl.

4. The composition of claim 1 wherein the acid is a mineral acid, a carboxylic acid or an aromatic organic acid.

5. The composition of claim 1 wherein the hydroxyamide is a fatty-acid hydroxyamide.

6. The composition of claim 1 wherein the hydroxyamide is a compound of Formula II,

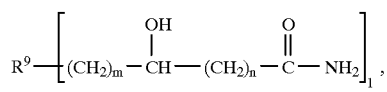

(II)

where $R^9$ is selected from the group consisting of hydrogen, a $C_1$–$C_5$ alkyl, a $C_1$–$C_5$ alkenyl and a $C_1$–$C_5$ alkynyl, n ranges from 0–20, m ranges from 0–20 and l is 1 or 2.

7. The composition of claim 1 wherein the composition comprises the product resulting from the combination of ingredients which include melamine resin, acid, hydroxyamide and polyalcohol cross-linking agent.

8. The composition of claim 1 wherein the composition comprises the product resulting from the combination of ingredients which include melamine resin, acid, hydroxyamide and solvent.

9. The composition of claim 1 wherein the composition comprises the product resulting from the combination of ingredients which include melamine resin, acid, hydroxyamide, polyalcohol cross-linking agent and solvent.

10. The composition of claim 9 wherein the amount of acid combined with melamine resin, hydroxyamide, polyalcohol cross-linking agent and solvent comprises at least about 9% of the total weight of the composition.

11. The composition of claim 9 wherein the composition comprises the product resulting from the combination of ingredients which include melamine resin in an amount ranging from about 20% to about 50% of the total weight of the composition, acid in an amount comprising at least about 9% of the total weight of the composition, hydroxyamide in an amount ranging from about 15% to about 35% of the total weight of the composition, polyalcohol cross-linking agent in an amount ranging from about 10% to about 50% of the total weight of the composition, and solvent.

12. A composition suitable for use in preparing a top-coating of a decorative overlay, the composition comprising the product resulting from the combination of ingredients which include melamine resin comprising a compound of Formula I in an amount ranging from about 20% to about 50% of the total weight of the composition,

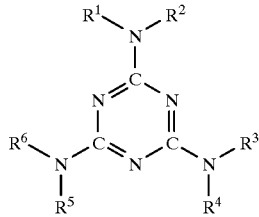

(I)

where $R^1$ through $R^6$ are, independently, selected from the group consisting of hydrogen, $C_1$–$C_4$ alkyl, —$R^7$OH, and —$R^7OR^8$, where at least two of $R^1$ through $R^6$ are, independently, —$R^7$OH or —$R^7OR^8$, and where $R^7$ and $R^8$ are, independently, $C_1$–$C_4$ alkyl, polyalcohol cross-linking agent in an amount ranging from about 10% to about 50% of the total weight of the composition, acid in an amount comprising at least about 9% of the total weight of the composition, hydroxyamide of Formula II in an amount ranging from about 15% to about 35% of the total weight of the composition,

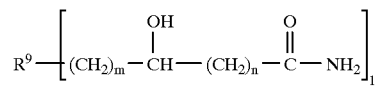

(II)

where $R^9$ is selected from the group consisting of hydrogen, a $C_1$–$C_5$ alkyl, a $C_1$–$C_5$ alkenyl and a $C_1$–$C_5$ alkynyl, n ranges from 0–20, m ranges from 0–20 and l is 1 or 2, and solvent.

13. The composition of claim 12 wherein $R^1$ through $R^6$ are, independently, selected from the group consisting of hydrogen, —$CH_2OH$ and —$CH_2OCH_3$, and at least two of $R^1$ through $R^6$ are, independently, —$CH_2OH$ or —$CH_2OCH_3$.

14. The composition of claim 12 wherein the melamine resin is hexamethoxymethylmelamine.

15. The composition of claim 12 wherein the acid is combined with melamine resin, hydroxyamide, polyalcohol cross-linking agent and solvent in an amount ranging from about 9% to about 20% of the total weight of the composition.

16. The composition of claim 12 wherein the acid is a mineral acid, a carboxylic acid or an aromatic organic acid.

17. The composition of claim 12 wherein the acid is a benzene sulfonic acid, a xylene sulfonic acid or a toluene sulfonic acid.

18. The composition of claim 12 wherein the hydroxyamide is $C_1$–$C_{20}$ fatty-acid hydroxyamide.

19. The composition of claim 12 wherein the hydroxyamide is N,N'-ethylene bis(12-hydroxystearamide).

20. The composition of claim 12 wherein the solvent is combined with melamine resin, acid, hydroxyamide, and polyalcohol cross-linking agent in an amount sufficient for the composition to have a viscosity suitable for commercial application to a substrate using a gravure cylinder.

21. The composition of claim 12 wherein the solvent predominantly comprises a $C_1$–$C_4$ alcohol.

22. The composition of claim 12 wherein the melamine resin is hexamethoxymethylmelamine, the hydroxyamide is N,N'-ethylene bis(12-hydroxystearamide), the acid is para-toluenesulfonic acid, the polyalcohol cross-linking agent is a modified castor-oil polyol and the solvent is methanol.

23. A process for preparing a composition suitable for use in forming a top-coating of a decorative overlay, the process comprising combining ingredients which include melamine resin, polyalcohol cross-linking agent, acid, hydroxyamide and solvent to form a uniformly-dispersed heterogeneous mixture.

24. The process of claim 23 wherein melamine resin, acid and hydroxyamide are combined with the weight ratio of acid:melamine resin being at least about 1:5 and the weight ratio of hydroxyamide:melamine resin ranging from about 1:3 to about 2:1.

25. A decorative overlay suitable for use in manufacturing decorative laminate panels, the overlay comprising a substrate and a top-coating overlying the substrate, the top-coating comprising a cured material, the material being formed by combining melamine resin, acid and hydroxyamide.

26. The decorative overlay of claim 25 wherein the material which is cured is formed by combining melamine resin, polyalcohol cross-linking agent, acid, hydroxyamide and solvent.

27. The decorative overlay of claim 25 wherein the top-coating overlies one or more intermediate layers situated between the top-coating and the substrate.

28. A method for producing a decorative overlay suitable for use in manufacturing decorative laminate panels, the method comprising
   applying a composition over a substrate to form a composition-coated substrate, the composition comprising a uniformly-dispersed heterogeneous mixture formed by combining ingredients which include melamine resin, acid and hydroxyamide, and
   drying the composition-coated substrate.

29. The method of claim 28 wherein the mixture is formed by combining ingredients which include melamine resin, acid, hydroxyamide and polyalcohol cross-linking agent.

30. The method of claim 28 wherein the mixture is formed by combining ingredients which include melamine resin, acid, hydroxyamide and solvent.

31. The method of claim 28 wherein the mixture is formed by combining ingredients which include melamine resin, acid, hydroxyamide, polyalcohol cross-linking agent, and solvent.

32. The method of claim 28 wherein the composition is applied over one or more intermediate layers which are situated over the substrate.

* * * * *